United States Patent [19]
Campagnuolo et al.

[11] 3,856,432
[45] Dec. 24, 1974

[54] SELF-GOVERNING TURBINE SPEED LIMITER

[75] Inventors: Carl J. Campagnuolo, Potomac; Paul A. Curto, Bethesda, both of Md.

[73] Assignee: The United States of America as represented by the Secretary of the Army, Washington, D.C.

[22] Filed: Sept. 27, 1973

[21] Appl. No.: 401,314

[52] U.S. Cl. .................... 416/45, 415/36, 415/123, 415/141, 416/186, 416/188
[51] Int. Cl. ............................................. F01d 7/02
[58] Field of Search ............... 415/12, 36, 141, 123; 416/39, 44, 45, 186, 188, 132, 240

[56] References Cited
UNITED STATES PATENTS

| 223,005 | 12/1879 | Pelzer | 416/188 |
|---|---|---|---|
| 1,090,016 | 3/1914 | Boyd | 415/123 |
| 2,370,600 | 2/1945 | Wightman | 416/132 |
| 2,382,108 | 8/1945 | Seewer | 415/123 |
| 2,418,012 | 3/1947 | Chester | 416/188 |
| 2,442,783 | 6/1948 | Senn | 416/240 |
| 3,228,475 | 1/1966 | Worthmann | 416/188 |

FOREIGN PATENTS OR APPLICATIONS

| 280,189 | 5/1913 | Germany | 416/45 |
|---|---|---|---|
| 338,436 | 8/1920 | Germany | 416/188 |
| 1,142,112 | 9/1957 | France | 415/159 |

*Primary Examiner*—C. J. Husar
*Attorney, Agent, or Firm*—Saul Elbaum

[57] ABSTRACT

A turbine speed limiter is inserted in the central portion of a turbine rotor for limiting the turbine speed at a predetermined RPM. The limiter consists of six leaves, which are folded around a conical hub at the center of the rotor. When a predetermined rotational speed of the rotor is acheived, centrifugal forces will cause the leaves to unfold and block the entrance channels of adjacently positioned turbine blades. If the leaves are fabricated from a resilient material, they will fold back toward the hub when the turbine rotor slows down.

8 Claims, 4 Drawing Figures

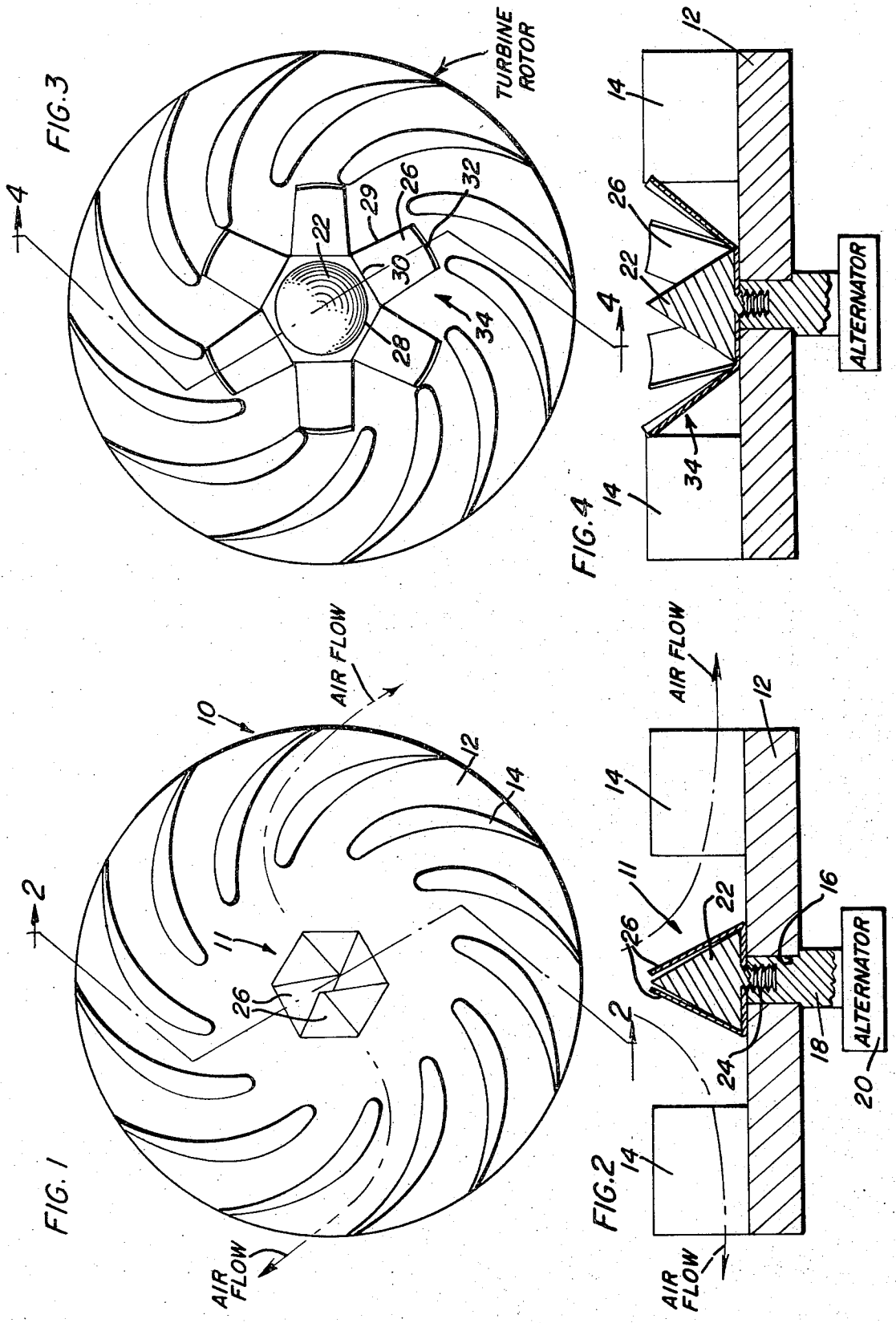

SELF-GOVERNING TURBINE SPEED LIMITER

RIGHTS OF THE GOVERNMENT

The invention described herein may be manufactured, used, and licensed by or for the United States Government for governmental purposes without the payment to us of any royalty thereon.

FIELD OF THE INVENTION

The present invention relates to speed limiters of turbines, and more particularly to a self-governing device for achieving such limiting.

BRIEF DESCRIPTION OF THE PRIOR ART

In electrically or electronically operated fuzes for ordnance missiles, the source of electric power is frequently a generator or alternator driven by a wind vane or turbine, rotation of which is caused by an air blast created by the travel of the missile through the air. In such use, it is desirable that electric power be available at the required voltages as rapidly as possible and that these voltages are not exceeded as occurs when the rotational rate of the wind turbine or vane reaches speeds higher than needed to deliver the required voltages. Voltage regulation circuitry has frequently been used to maintain the voltage thus produced within the desired limits. Circuitry of this type is comparatively costly and occupies space which is desired for other components. Even with the use of regulation circuitry, the generator or alternator experiences extremely high rotational speed thus requiring precision bearings which are quite costly.

BRIEF DESCRIPTION OF THE INVENTION

In order to provide a uniform generator or alternator speed and thus a voltage which will not reach excessive values, the present invention is directed to a self-regulating turbine that utilizes mechanical control of air flow across the turbine blades. Such an approach eliminates the requirement for regulating circuitry as discussed above. Mechanical speed limiting for turbines has been previously developed as set forth in U.S. Pat. No. 2,766,964. However, this patent relies upon resilient blades for varying the air stream between the blades, in response to changes of centrifugal force as the turbine rotor rotates. The present invention is an improvement of the prior art approaches, including that disclosed in the mentioned patent.

The above-mentioned objects and advantages of the present invention will be more clearly understood when considered in conjunction with the accompanying drawings, in which:

BRIEF DESCRIPTION OF THE FIGURES

FIG. 1 is an end view of a turbine rotor having the speed limiter installed in the central portion thereof. The limiter is shown in a condition before it is triggered into operation.

FIG. 2 is a sectional view taken along a plane passing through section line 2—2, in FIG. 1.

FIG. 3 is a view similar to that of FIG. 1 but illustrates the leaves of the speed limiting device in an unfolded or triggered position, which occurs after a predetermined rotational speed of the rotor is exceeded.

FIG. 4 is a cross sectional view taken along a plane passing through section line 4—4.

DETAILED DESCRIPTION OF THE INVENTION

Referring to the Figures and more particularly FIG. 1 thereof, reference numeral 10 generally indicates a turbine rotor with the speed limiter of the present invention centrally mounted thereon. A circular disc or mounting plate 12 mounts equally spaced stationary blades 14. The blades are curved and have a rounded inward end and an arc shaped outer end formed in the conventional manner. An alternator shaft 18 passes through a centrally formed opening 16, in the plate 12. The shaft 18 is suitably attached to the plate 12 so that it turns with the turbine rotor. At the end of a shaft is an alternator 20 which provides electrical power. Although the previously discussed text explains the utilization of this power to operate fuzes for ordnance missiles, it is stressed that the construction of the invention and its operation is not limited to such use. Rather, the present invention has application to limit the speed of various turbines of different designs and uses.

Considering the construction of the speed limiter 11, a conical hub 22 is provided with a threaded member 24 that screws into the alternator shaft 18. The conical hub 22 supports a number of leaves 26 thereon. The number of leaves has been chosen in the preferred embodiment, to equal one half the number of blades. However, this relationship and number is not critical and is merely exemplary.

FIGS. 3 and 4 clearly illustrate the shape of each leaf 26 and the attachment of the leaves 26 to a hexagonal central portion 28. A straight line articulation 30 joins the central hexagonal body with a corresponding leaf 26. The outer end of each leaf is arcuate while the side edges 29 are straight.

FIG. 3 illustrates the dispostion of each leaf relative to an air passageway 34 after the leaves have been unfolded. In a first mode of operation, the leaves 26 are fabricated from a generally non-resilient material so that once the leaves are unfolded, they do not fold back onto the hub 22, should the rotational speed of the hub drop below that required to unfold the leaves. However, if the material for the leaves was selected to be of a resilient nature, the leaves could fold back onto the hub if the turbine speed decreases below the threshold value for unfolding. In either case, the speed limiter will insure that the turbine speed does not exceed a predetermined RPM regardless of the inlet air flow velocities.

OPERATION OF INVENTION

Initially, the speed limiter maintains the configuration illustrated in FIGS. 1 and 2. In this configuration, the leaves 26 are folded against the conical hub 22. When a predetermined rotational speed is achieved, centrifugal forces will cause the leaves to unfold and block the entrance channel 34 of the blades as illustrated in FIG. 3 and 4. The torque generated by the turbine is directly proportional to mass flow ($m$), so a lowering of ($m$) can cause the torque to decrease, lowering and limiting the rotational speed of the turbine. The conical body 22, in the center of the turbine rotor 11, plays a twofold role. First, it acts as a retainer or forming tool for the leaves when they are in the folded state. This may be seen by the curved surface of the body of each leaf 26, as shown in FIG. 4. Second, it helps to spill some flow of air at the high inlet ram velocity over the turbine blades, thus further limiting the turbine torque.

In conclusion, from a reading of the Specification, it will be appreciated that the present invention offers a simple and reliable speed limiter for turbines. The invention is an advance in the art and provides an improvement in the field of self-governing turbines.

It should be understood that the invention is not limited to the exact details of construction shown and described herein for obvious modifications will occur to persons skilled in the art.

What is claimed is:

1. In a turbine rotor having a support plate mounting turbine blades around the periphery, a speed limiting device comprising:

a hub centrally mounted on the support plate;

movable means movably connected to the hub, the movable means having a first position whereat they overlay the hub to remain in non-interferring relationship with air flow through passageways between blades, the movable means responding to centrifugal force acting thereon when a predetermined rotational speed of the rotor is exceeded, said response resulting in movement of the movable means for the blockage of at least one of the passageways;

whereby an increase of turbine rotor speed is averted; and wherein the hub is a conical member having the twofold function of serving as a retainer for the movable means as well as spilling flow of a high inlet ram velocity over the blades when the movable means move to the blockage position.

2. In a turbine rotor having a support plate mounting turbine blades around the periphery, a speed limiting device comprising:

a hub centrally mounted on the support plate; and movable means movably connected to the hub, the movable means having a first position whereat they overlay the hub to remain in non-interferring relationship with air flow through passageways between blades, the movable means responding to centrifugal force acting thereon when a predetermined rotational speed of the rotor is exceeded, said response resulting in movement of the movable means for the blockage of at least one of the passageways;

whereby an increase of turbine rotor speed is averted; and wherein the movable means comprises at least one leaf having a surface conforming to the shape of the hub for maintaining the leaf in juxtaposition with the hub when the rotor speed is below the predetermined speed.

3. The structure set forth in claim 1 wherein the movable means comprises at least one leaf having a surface conforming to the shape of the hub for maintaining the leaf in juxtaposition with the hub when the rotor speed is below the predetermined speed.

4. The subject matter defined in claim 1 wherein the movable means comprises a plurality of individual leaves articulating from a central body mounted to the hub, each leaf having a curvature conforming to the shape of the hub for maintaining the leaf in juxtaposition with the hub when the rotor speed is below the predetermined speed.

5. The structure as set forth in claim 4 wherein the length of each leaf is sufficient to extend radially outward, when the predetermined speed is exceeded, to block the radially inward entrance of a corresponding passageway.

6. The subject matter as recited in claim 5 wherein the number of leaves is equal to one half the number of turbine blades.

7. The subject matter of claim 4 wherein each leaf is so fabricated to cause unfolding of each leaf to a blockage position when the rotor speed exceeds the predetermined speed, the leaf remaining in the unfolded position even after the rotor speed decreases below the predetermined speed.

8. The subject matter of claim 4 wherein each leaf is fabricated from a resilient material to permit the unfolding of each leaf to a blockage position when the predetermined speed is exceeded, and to permit the refolding of each leaf onto the hub when the rotor speed falls below the predetermined speed.

* * * * *